United States Patent
Redaelli (10) Patent No.: US 12,455,691 B2
(45) Date of Patent: Oct. 28, 2025

(54) MEMORY DEVICE CONTROLLED LOW TEMPERATURE THERMAL THROTTLING

(71) Applicant: Micron Technology, Inc., Boise, ID (US)

(72) Inventor: Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 53 days.

(21) Appl. No.: 18/511,304

(22) Filed: Nov. 16, 2023

(65) Prior Publication Data

US 2024/0176506 A1    May 30, 2024

Related U.S. Application Data

(60) Provisional application No. 63/385,437, filed on Nov. 30, 2022.

(51) Int. Cl.
 *G06F 3/06*    (2006.01)
(52) U.S. Cl.
 CPC .......... *G06F 3/0619* (2013.01); *G06F 3/0634* (2013.01); *G06F 3/0659* (2013.01); *G06F 3/0673* (2013.01)

(58) Field of Classification Search
 CPC .... G06F 3/0634; G06F 3/0659; G06F 3/0673; G06F 3/0679
 See application file for complete search history.

(56) References Cited

U.S. PATENT DOCUMENTS

2016/0188255 A1* 6/2016 Powell ................. G11B 33/144
                                                                    711/103

\* cited by examiner

*Primary Examiner* — Yong J Choe
(74) *Attorney, Agent, or Firm* — Harrity & Harrity, LLP (57) ABSTRACT

Implementations described herein relate to memory device initiated low temperature thermal throttling. A memory device may receive, from a host device, low temperature thermal throttling information that enables a thermal throttling operation by the memory device. The low temperature thermal throttling information may include an indication of a temperature threshold or a time for performing the thermal throttling operation. The memory device may perform the thermal throttling operation based on moving dummy data from a controller associated with the memory device to a particular location of the memory device associated with the thermal throttling operation. The memory device may complete the thermal throttling operation based on the temperature of the memory device satisfying the temperature threshold.

20 Claims, 6 Drawing Sheets

MEMORY DEVICE CONTROLLED LOW TEMPERATURE THERMAL THROTTLING

CROSS-REFERENCE TO RELATED APPLICATION

This Patent Application claims priority to U.S. Provisional Patent Application No. 63/385,437, filed on Nov. 30, 2022, entitled "MEMORY DEVICE CONTROLLED LOW TEMPERATURE THERMAL THROTTLING," and assigned to the assignee hereof. The disclosure of the prior Application is considered part of and is incorporated by reference into this Patent Application.

TECHNICAL FIELD

The present disclosure generally relates to memory devices, memory device operations, and, for example, to memory device initiated low temperature thermal throttling.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

A memory device may include memory and a controller, and may be configured to perform one or more memory operations. For example, the controller of the memory device may be configured to write data to the memory of the memory device or to read data from the memory of the memory device. In some cases, the memory device may perform the memory operations within a safe temperature range. For example, the controller may write data to the memory within a safe temperature range that is between 20 degrees Celsius (20° C.) and 100° C. At another time, the controller may read the data from the memory within the safe temperature range. This may result in the data being successfully written to the memory of the memory device and successfully read from the memory of the memory device. In some other cases, the memory device may perform one or more of the memory operations at a temperature that is outside of the safe temperature range. For example, the controller may write data to the memory at a temperature that is between −40° C. and 20° C. At another time, the controller may read the data from the memory at a temperature that is between 70° C. and 130° C. This may be referred to as a cross temperature range memory operation, and may result in errors during the read or write operations of the memory device.

In some implementations, a host device may transmit low temperature thermal throttling information to the memory device that enables the memory device to perform a thermal throttling operation. The low temperature thermal throttling information may include an indication of a temperature threshold and/or a time for performing the thermal throttling operation. The memory device may receive the low temperature thermal throttling information from the host device, and may perform the thermal throttling operation based on the low temperature thermal throttling information. For example, the memory device may initiate the thermal throttling operation based on a current temperature of the memory device not satisfying the temperature threshold and/or based on receiving a thermal throttling start command from the host device. In some implementations, performing the thermal throttling operation may include moving dummy data from a controller associated with the memory device to a particular location of the memory device associated with the thermal throttling operation. The memory device may complete the thermal throttling operation based on the temperature of the memory device satisfying the temperature threshold. As a result, the temperature of the memory device may be increased prior to the memory device performing memory operations such as background memory operations. This may reduce the likelihood of errors that occur during the read and write operations of the memory device.

Figure 1:
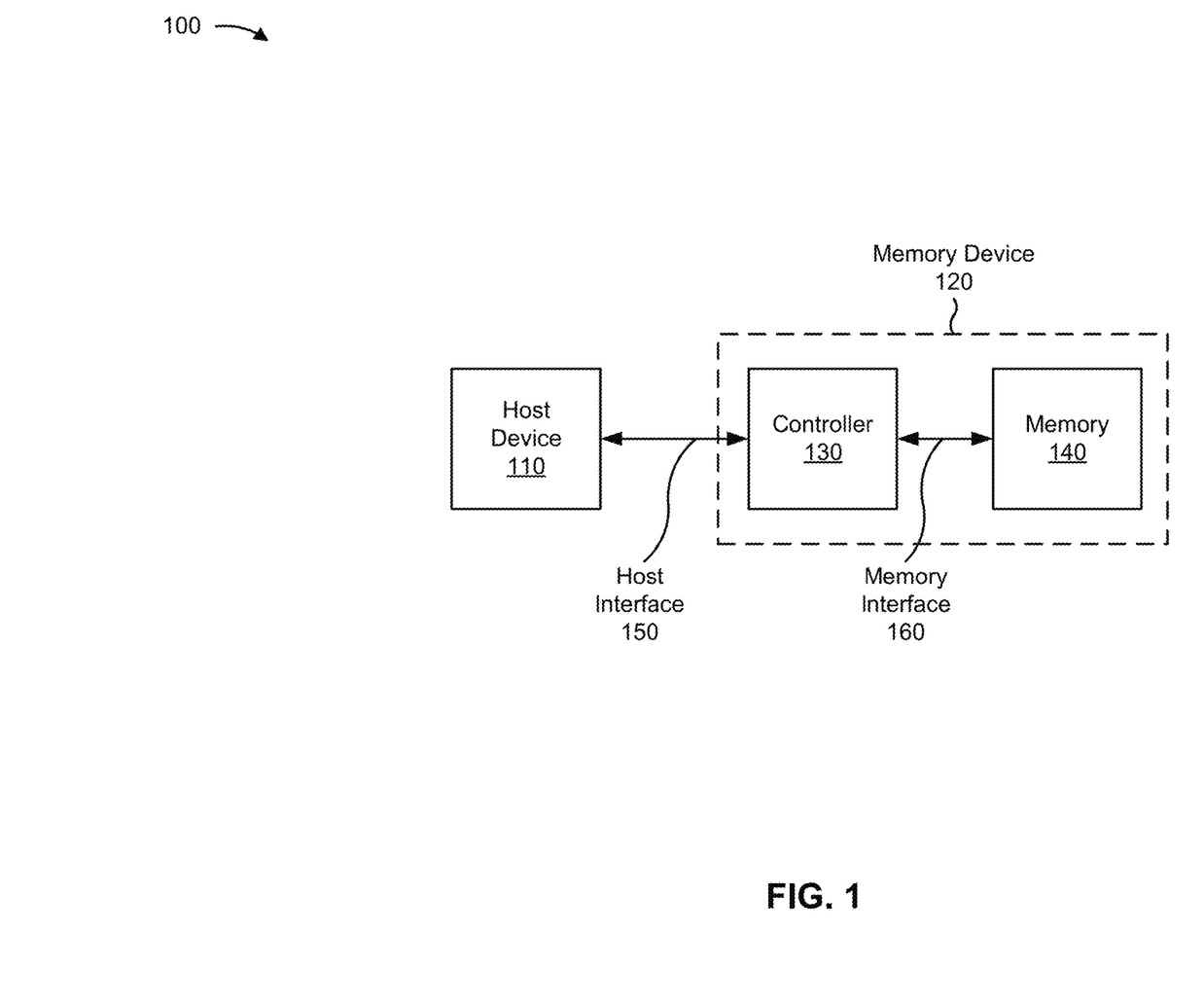
FIG. 1 is a diagram illustrating an example system capable of memory device initiated low temperature thermal throttling.

FIG. 1 is a diagram illustrating an example system 100 capable of memory device initiated low temperature thermal throttling. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 may be configured to receive, from a host device, low temperature thermal throttling information that enables a thermal throttling operation by the memory device, wherein the low temperature thermal throttling information includes an indication of a temperature threshold; initiate the thermal throttling operation based on the low temperature thermal throttling information, wherein the one or more components, to initiate the thermal throttling operation, are configured to move dummy data from a controller associated with the memory device to a particular location of the memory device associated with the thermal throttling operation; and complete the thermal throttling operation based on the temperature of the memory device satisfying the temperature threshold.

In some implementations, the host device 110 may be configured to: transmit low temperature thermal throttling information to a memory device that enables the memory device to perform a thermal throttling operation, wherein the low temperature thermal throttling information includes an indication of a temperature threshold. The memory device 120 may be configured to: receive the low temperature thermal throttling information from the host device; initiate the thermal throttling operation based on the low temperature thermal throttling information, wherein the memory device, to initiate the thermal throttling operation, is configured to move dummy data from a controller associated with the memory device to a particular location of the memory device associated with the thermal throttling operation; and complete the thermal throttling operation based on the temperature of the memory device satisfying the temperature threshold.

In some implementations, the memory device 120 may be configured to receive low temperature thermal throttling information that enables a thermal throttling operation by the memory device; perform the thermal throttling operation, based on the temperature of the memory device not satisfying a temperature threshold, by moving dummy data from a controller associated with the memory device to a particular location of the memory device associated with the thermal throttling operation; receive a write command associated with writing data to the memory device or a read command associated with reading data from the memory device while the memory device is performing the thermal throttling operation; stop the thermal throttling operation based on receiving the write command or the read command; perform a write operation associated with the write command or a read operation associated with the read command; and continue the thermal throttling operation based on completing the write operation associated with the write command or the read operation associated with the read command.

As indicated above, FIG. 1 is provided as an example. Other examples may differ from what is described with regard to FIG. 1.

Figure 2:
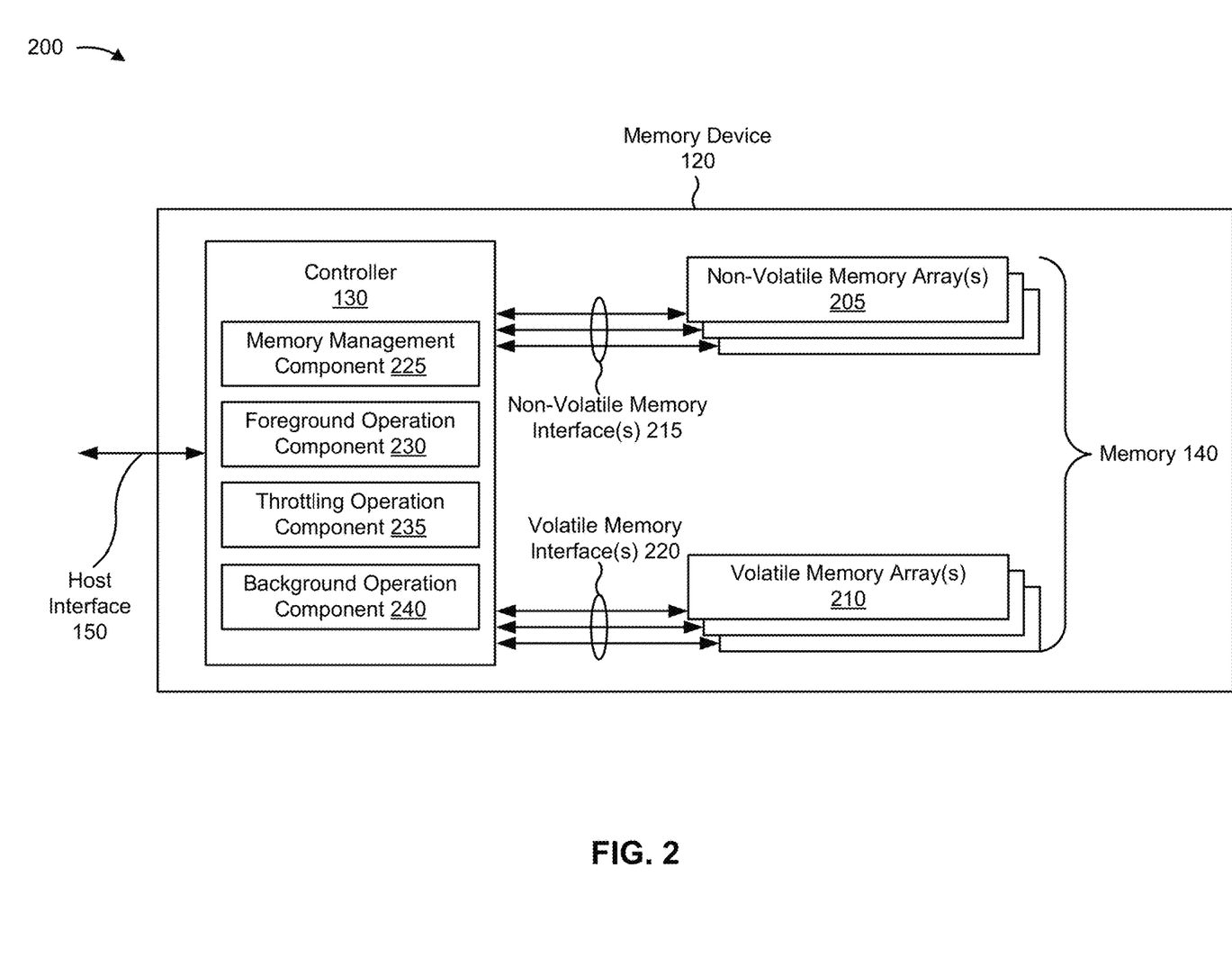
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a foreground (FG) operation component 230, a throttling operation component 235, and/or a background (BG) operation component 240. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The FG operation component 230 may be configured to perform one or more foreground operations associated with the memory device 120. The FG operation component 230 may receive information and/or a command from the host device 110 associated with the memory device 120 performing a low temperature thermal throttling operation. The FG operation component 230 may initiate the thermal throttling operation based on the information or the command. For example, the FG operation component 230 may initiate the thermal throttling operation based on a temperature of the memory device 120 being below a temperature threshold or based on the command indicating an amount of data to be written to a particular location of the memory device 120 associated with the thermal throttling operation. The FG operation component 230 may send a low temperature thermal throttling operation complete message to the host device 110 based on a completion of the thermal throttling operation. In some implementations, the FG operation component 230 may receive a read command or a write command from the host device 110 while the memory device is performing the thermal throttling operation. The FG operation component 230 may cause the thermal throttling operation to be suspended based on receiving the read command or the write command. The FG operation component 230 may cause the thermal throttling operation to be resumed based on a completion of a read operation associated with the read command or a completion of a write operation associated with the write command.

The throttling operation component 235 may perform the low temperature thermal throttling operation. The throttling operation component 235 may receive an indication from the FG operation component 230 to initiate the thermal throttling operation, and may perform the thermal throttling operation based on receiving the indication. In some implementations, performing the thermal throttling operation may include moving dummy data from the controller 130 associated with the memory device 120 to a portion of the memory 140 that is allocated for receiving dummy data associated with the thermal throttling operation. In some other implementations, performing the thermal throttling operation may include moving dummy data from the host device 110 to the portion of the memory 140 that is allocated for receiving dummy data associated with the thermal throttling operation. The throttling operation component 235 may receive an indication from the FG operation component 230 to suspend the thermal throttling operation based on receiving the read command or the write command from the host device 110. The throttling operation component 235 may suspend the thermal throttling operation while the FG operation component 230 is performing the read operation or the write operation, and may resume the thermal throttling operation based on a completion of the read operation or the write operation.

The BG operation component 240 may be configured to perform one or more background operations associated with the memory device 120. For example, the BG operation component 240 may perform one or more data folding operations associated with the memory device 120. The one or more data folding operations may be temperature sensitive data folding operations. In some implementations, the BG operation component 240 may receive an indication from the throttling operation component 235 to start performing the background operations. For example, the BG operation component 240 may receive the indication from the throttling operation component 235 based on the throttling operation component 235 completing the thermal throttling operation. The BG operation component 240 may initiate and perform the BG operations based on the indication from the throttling operation component 235.

Figure 5:
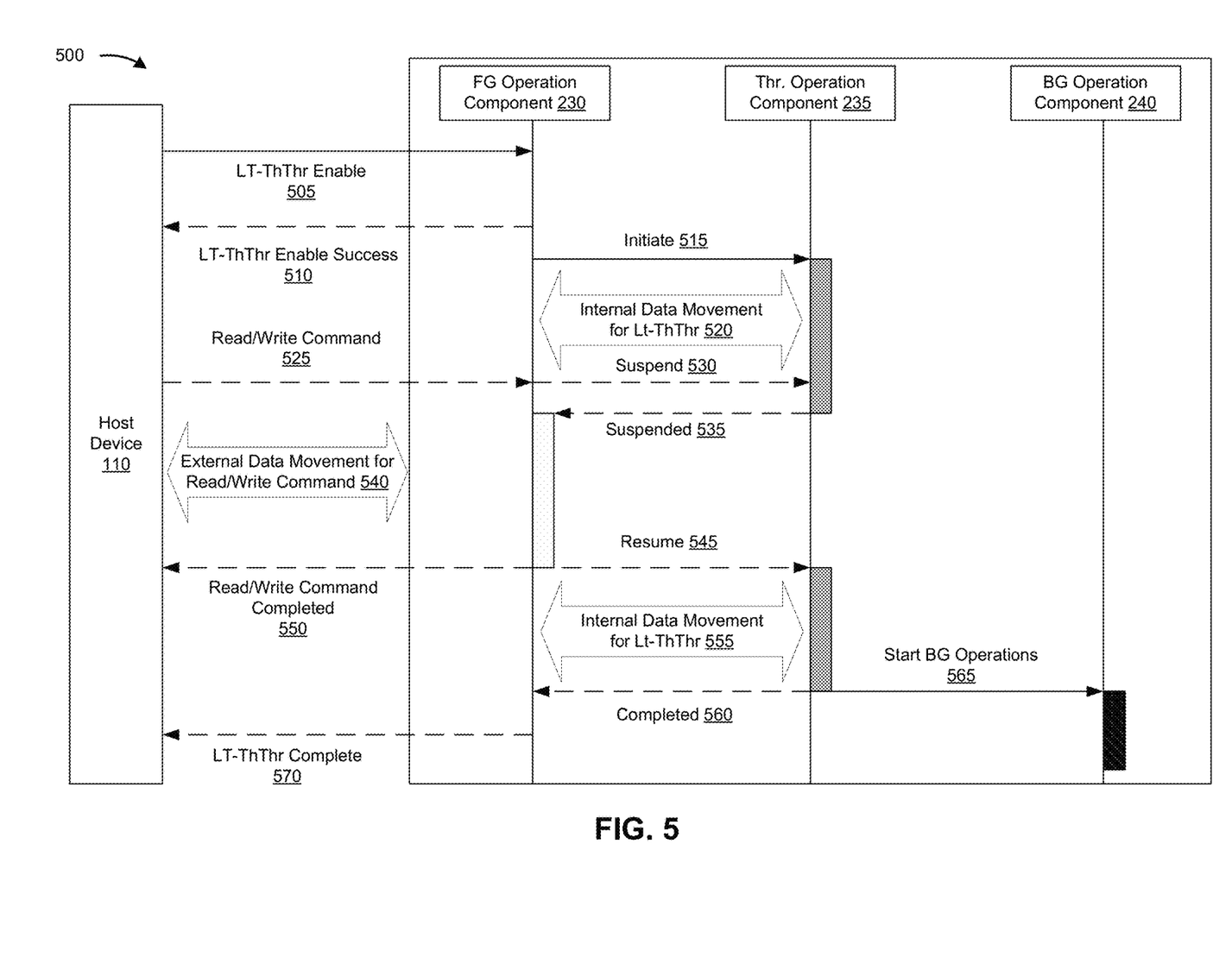
FIG. 5 is a diagram illustrating an example of memory device initiated low temperature thermal throttling.
Figure 6:
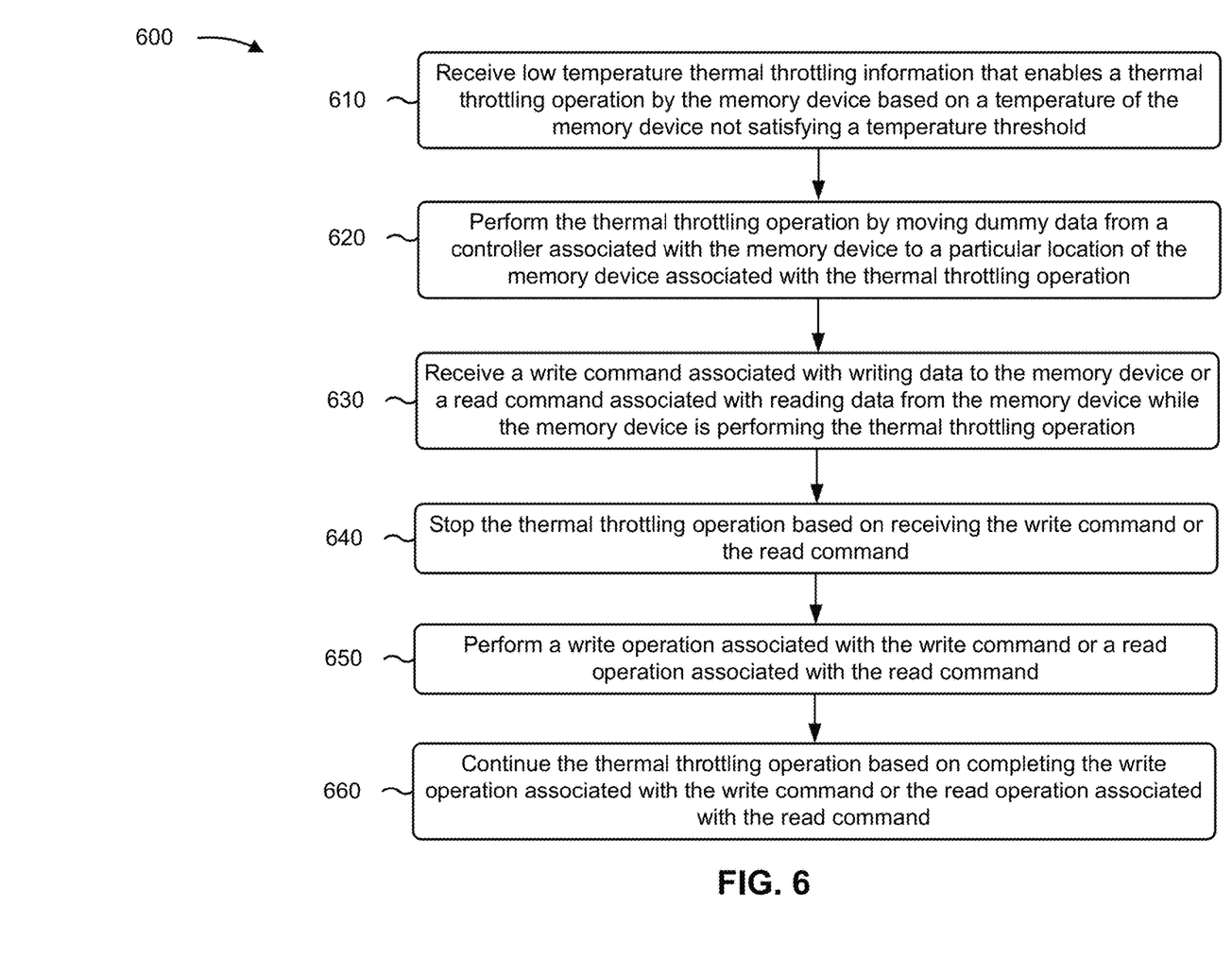
FIG. 6 is a flowchart of an example method associated with memory device initiated low temperature thermal throttling.

One or more devices or components shown in FIG. 2 may be configured to perform operations described elsewhere herein, such as one or more operations of FIG. 5 and/or one or more process blocks of the methods of FIG. 6. For example, the controller 130, the memory management component 225, the FG operation component 230, the throttling operation component 235, and/or the BG operation component 240 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

As indicated above, FIG. 2 is provided as an example. Other examples may differ from what is described with regard to FIG. 2.

Figure 3:
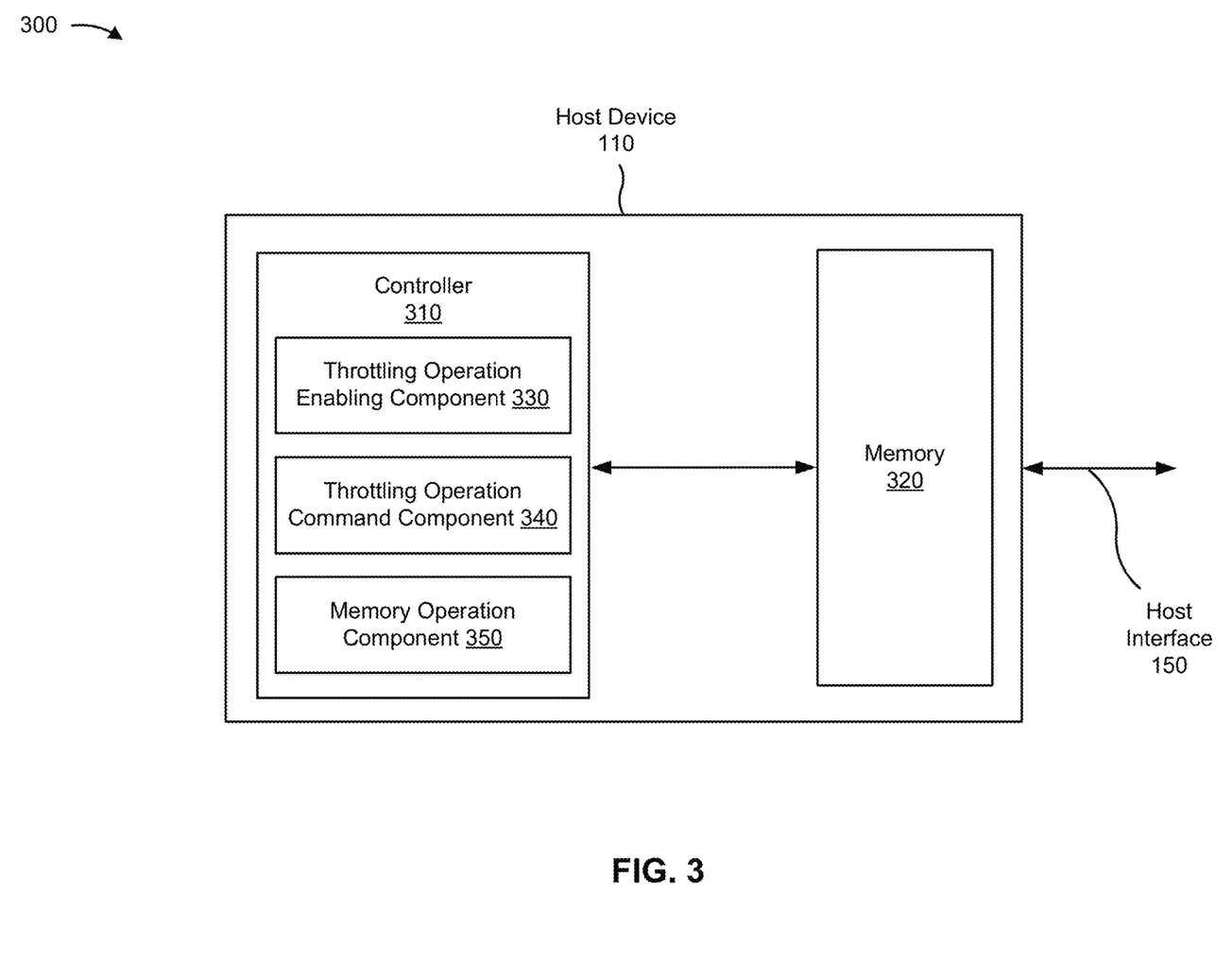
FIG. 3 is a diagram of example components included in a host device.

FIG. 3 is a diagram of example components 300 included in a host device 110. The host device 110 may include a host controller 310 and host memory 320. The host controller 310 associated with the host device 110 may include some or all of the features of the controller 130 associated with the memory device 120. Additionally, or alternatively, the host memory 320 associated with the host device 110 may include some or all of the features of the memory 140 associated with the memory device 120.

The host controller 310 may control operations of the host memory 320, such as by executing one or more instructions. For example, the host device 110 may store one or more instructions in the host memory 320, and the host controller 310 may execute those one or more instructions. Additionally, or alternatively, the host controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the host controller 310. The host controller 310 may execute the set of instructions to perform one or more operations or methods described herein. In some implementations, execution of the set of instructions, by the host controller 310, causes the host controller 310 and/or the host device 110 to perform one or more operations or methods described herein. In some implementations, hardwired circuitry is used instead of or in combination with the one or more instructions to perform one or more operations or methods described herein. Additionally, or alternatively, the host controller 310 and/or one or more components of the host device 110 may be configured to perform one or more operations or methods described herein.

As shown in FIG. 3, the host controller 310 may include a throttling operation enabling component 330, a throttling operation command component 340, and/or a memory operation component 350. In some implementations, one or more of these components are implemented as one or more instructions (e.g., firmware) executed by the host controller 310. Alternatively, one or more of these components may be implemented as dedicated integrated circuits distinct from the host controller 310.

The throttling operation enabling component 330 may be configured to enable a low temperature thermal throttling operation by the memory device 120. For example, the throttling operation enabling component 330 may transmit a thermal throttling enable (Lt-ThThr Enable) command to the memory device 120 that enables the memory device 120 to perform the thermal throttling operation. The thermal throttling enable command may include an indication of a temperature threshold and/or a time for performing the thermal throttling operation.

The throttling operation command component 340 may be configured to instruct the memory device 120 to perform the low temperature thermal throttling operation. For example, the throttling operation command component 340 may transmit a thermal throttling command (Lt-ThThr Command) to the memory device 120 that instructs the memory device 120 to perform the thermal throttling operation. The thermal throttling command may indicate an amount of data to be written from the host device 110 to a particular portion of the memory device 120 associated with the thermal throttling operation.

The memory operation component 350 may be configured to write data to the memory device 120 and to read data from the memory device 120. For example, the memory operation component 350 may transmit a write command that instructs the memory device 120 to write data to a location in the memory device 120 or may transmit a read command that instructs the memory device 120 to read data from a location in the memory device 120. In some implementations, the memory operation component 350 may transmit the write command or the read command while the memory device 120 is performing the thermal throttling operation. Additional details are described herein.

One or more devices or components shown in FIG. 3 may be used to carry out operations described elsewhere herein, such as one or more operations of FIG. 5 and/or one or more process blocks of the methods of FIG. 6. For example, the host controller 310, the throttling operation enabling component 330, the throttling operation command component 340, and/or the memory operation component 350 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

Figure 4:
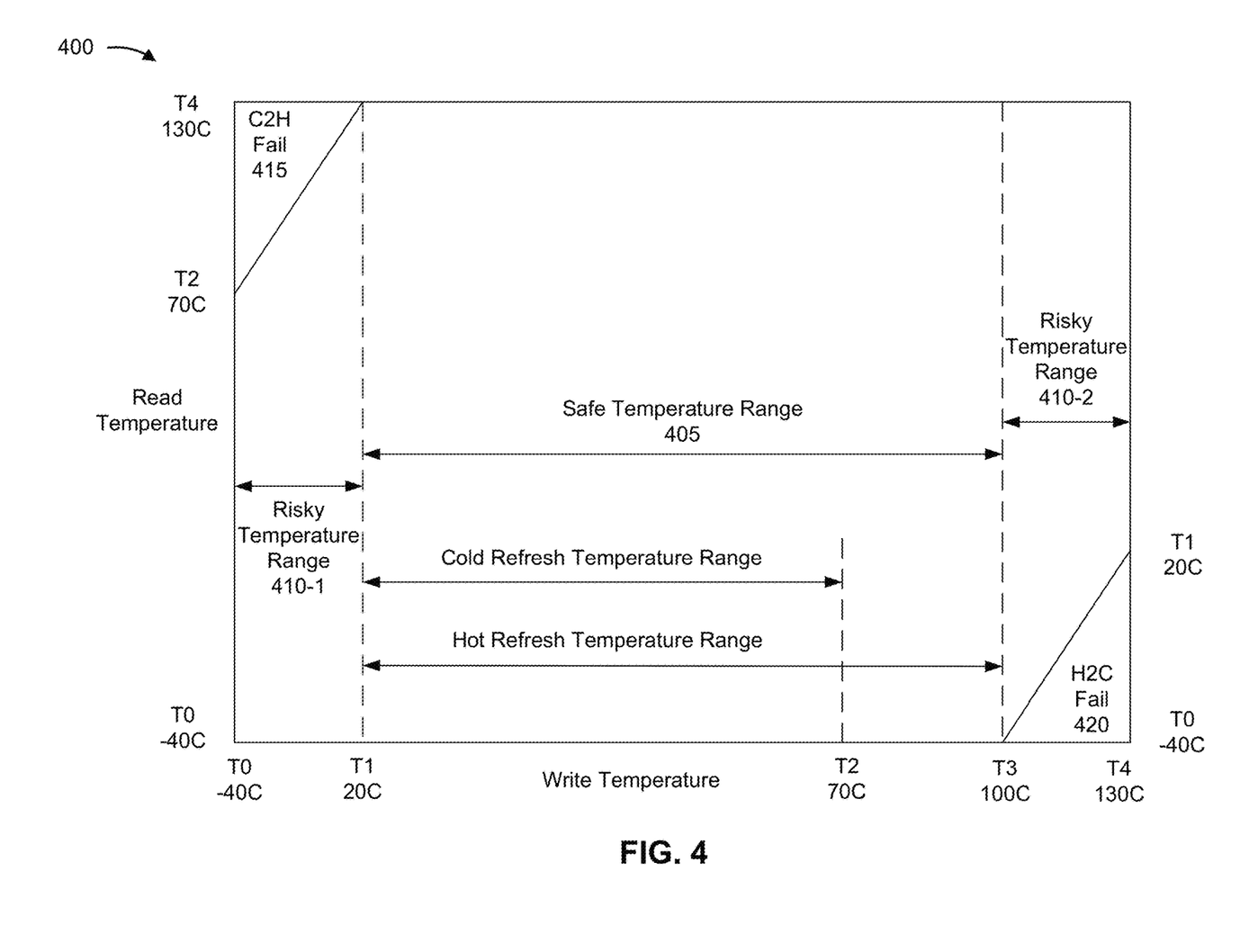
FIG. 4 is a diagram illustrating an example of cross temperature range memory operations.

FIG. 4 is a diagram illustrating an example 400 of cross temperature range memory operations. In some cases, the memory device 120 may perform one or more memory operations within a safe temperature range 405 that includes temperatures between T1 (20° C.) and T3 (100° C.). For example, the controller 130 may write data to the memory 140 within the safe temperature range 405 or may read data from the memory 140 within the safe temperature range 405. This may result in the data being successfully written to the memory 140 of the memory device 120 or successfully read from the memory 140 of the memory device 120. In some other cases, the memory device 120 may perform a memory operation at a temperature that is below the safe temperature range 405 and may perform another memory operation at a temperature that is above the safe temperature range 405. This may be referred to as a cross temperature range memory operation. In one example, the controller 130 may write data to the memory 140 at a temperature that is between T0 (−40° C.) and T1 (20° C.). At another time, the controller 130 may read the data from the memory 140 at a temperature that is between T2 (70° C.) and T4 (130° C.). This is shown by the first risky temperature range 410-1 and may result in a cold-to-hot (C2H) fail 415 during the read operation. In another example, the controller 130 may write data to the memory 140 at a temperature that is between T3 (100° C.) and T4 (130° C.). At another time, the controller 130 may read the data from the memory 140 at a temperature that is between T0 (−40° C.) and T1 (20° C.). This is shown by the second risky temperature range 410-2 and may result in a hot-to-cold (H2C) fail 420 during the read operation. As described herein, any background operation that causes data folding to be performed at a lower corner temperature may result in a failure or may require a large data recovery operation when the data is read at a higher temperature.

A memory device may produce some heat under normal use, but may produce significant heat when under a heavy workload. When heat is produced under the heavy workload, memory device performance may be decreased and hardware components of the memory device may be susceptible to damage. When a component reaches a high enough temperature, performance of the component and/or performance of the memory device may be limited (e.g., stopped or slowed down) in order to prevent heat build-up and encourage cooling. This may be referred to as high temperature thermal throttling. In contrast, low temperature thermal throttling (as described herein) may be used to protect the device hardware. The low temperature thermal throttling may be an artificial workload that is generated inside of the NVM to increase the memory temperature using the self-heating. The term "thermal throttling" used herein refers to low temperature thermal throttling and does not refer to high temperature thermal throttling unless specifically indicated.

As indicated above, FIG. 4 is provided as an example. Other examples may differ from what is described with regard to FIG. 4.

FIG. 5 is a diagram illustrating an example 500 of memory device initiated low temperature thermal throttling.

As shown by reference number 505, the host device 110 may transmit a low temperature thermal throttling enable command (LT-ThThr Enable). The low temperature thermal throttling enable command may enable the memory device 120 to perform a thermal throttling operation. The thermal throttling operation may be used by the memory device 120 to increase a temperature of the memory device 120. In some implementations, the low temperature thermal throttling enable command may include one or more parameters, such as a temperature threshold and a time for performing the thermal throttling operation. In some implementations, the memory device 120 may transmit a temperature indication that indicates a temperature of the memory device 120. For example, the memory device 120 may transmit the temperature indication when the temperature of the memory device 120 does not satisfy a temperature threshold (e.g., when the temperature of the memory device is less than, or less than or equal to, the temperature threshold). Additionally, or alternatively, the memory device 120 may periodically transmit the temperature of the memory device 120 to the host device 110, and the host device 110 may transmit the low temperature thermal throttling enable command to the memory device 120 based on the temperature of the memory device 120 not satisfying the temperature threshold.

As shown by reference number 510, the memory device 120 may transmit a low temperature thermal throttling enable success command (LT-ThThr Enable Success) to the host device 110. The memory device 120 may transmit the low temperature thermal throttling enable success command to the host device 110 based on the memory device 120 receiving the low temperature thermal throttling enable command and/or based on the memory device 120 initiating the thermal throttling operation.

As shown by reference number 515, the FG operation component 230 and/or the memory device 120 may initiate the thermal throttling operation. In some implementations, the FG operation component 230 and/or the memory device 120 may initiate the thermal throttling operation based on the temperature of the memory device 120 not satisfying the temperature threshold. The temperature threshold may be a temperature that is between T0 (−40° C.) and T1 (20° C.). For example, the temperature threshold may be −10° C. or −20° C. In some other implementations, the host device 110 may transmit a thermal throttling start command to the memory device 120 based on the temperature of the memory device 120 being below the temperature threshold. In this case, the memory device 120 may initiate the thermal throttling operation based on receiving the thermal throttling start command.

As shown by reference number 520, the throttling operation component 235 and/or the memory device 120 may perform the thermal throttling operation. In some implementations, the throttling operation component 235 may perform the thermal throttling operation by moving data from a controller associated with the memory device 120 to a particular portion of the memory device 120 that is used for the thermal throttling operation. The controller may be the controller 130 or may be a different controller such as a microcontroller. The particular portion of the memory device 120 that is used for the thermal throttling operation may include one or more bits of the memory 140 that are used for performing write and read operations while the thermal throttling operation is being performed.

As shown by reference number 525, the host device 110 may transmit a read command or a write command to the memory device 120. The read command or the write command may be associated with a standard memory operation of the memory device 120 (for example, may not be associated with the thermal throttling operation).

As shown by reference number 530, the FG operation component 230 and/or the memory device 120 may suspend the thermal throttling operation based on receiving the read command or the write command from the host device 110. For example, the FG operation component 230 may indicate for the throttling operation component 235 to stop performing the thermal throttling operation. In some other implementations, the FG operation component 230 and/or the memory device 120 may abort or delay the performing of the read command or the write command until the thermal throttling operation is complete.

As shown by reference number 535, the throttling operation component 235 may indicate to the FG operation component 230 that the thermal throttling operation has been suspended.

As shown by reference number 540, the memory device 120 may perform a write operation associated with the write command or may perform a read operation associated with the read command. The write operation and/or the read operation may be associated with the standard memory operation of the memory device 120. For example, the write command may be an instruction to write data to a portion of the memory 140 that is not associated with the thermal throttling operation and the read command may be an instruction to read data from the portion of the memory 140 that is not associated with the thermal throttling operation. The write operation and/or the read operation may be performed while the thermal throttling operation is in a suspended state.

As shown by reference number 545, the FG operation component 230 may indicate for the throttling operation component 235 to resume the thermal throttling operation. The FG operation component 230 may indicate for the throttling operation component 235 to resume the thermal throttling operation based on the memory device 120 completing the write operation or the read operation associated with the standard memory operation of the memory device 120.

As shown by reference number 550, the FG operation component 230 and/or the memory device 120 may indicate to the host device 110 that the memory device 120 has completed the write operation or the read operation associated with the standard memory operation of the memory device 120.

As shown by reference number 555, the throttling operation component 235 and/or the memory device 120 may resume (e.g., automatically resume) performing the thermal throttling operation. For example, the throttling operation component 235 may continue moving data from the controller associated with the memory device 120 to the particular portion of the memory device 120 that is used for the thermal throttling operation.

As shown by reference number 560, the throttling operation component 235 may indicate to the FG operation component 230 that the thermal throttling operation is complete. In some implementations, the throttling operation component 235 may indicate that the thermal throttling operation is complete based on an expiration of the time period and/or based on the temperature of the memory device 120 satisfying the temperature threshold.

As shown by reference number 565, the FG operation component 230 may indicate to the BG operation component 240 to start performing background operations. The background operations may include data folding operations and/or may include temperature sensitive background operations. The BG operation component 240 may perform the background operations based on the indication that the thermal throttling operation is complete.

As shown by reference number 570, the FG operation component 230 and/or the memory device 120 may indicate that the thermal throttling operation is complete. For example, the FG operation component 230 and/or the memory device 120 may transmit a low temperature thermal throttling complete (LT-ThThr Complete) command to the host device 110 to indicate that the thermal throttling operation is complete.

In some implementations, the memory device 120 may stop performing the thermal throttling operation based on the temperature of the memory device 120 satisfying the temperature threshold. In some other implementations, the memory device 120 may stop performing the thermal throttling operation based on an expiration of the time for performing the thermal throttling operation. In this case, the temperature of the memory device 120 may not satisfy the temperature threshold. In some implementations, the memory device 120 may initiate another thermal throttling operation. For example, the memory device 120 automatically initiate another thermal throttling operation until the temperature threshold is satisfied. Alternatively, the host device 110 may instruct the memory device 120 to perform another thermal throttling operation until the temperature threshold is satisfied. For example, the host device 110 may transmit another thermal throttling start command to the memory device 120.

In some implementations, memory device initiated low temperature thermal throttling may result in a heating of the memory cells (e.g., NAND memory cells) but may result in little to no heating of the controller associated with the memory device. In contrast, host device initiated low temperature thermal throttling may result in a heating of the memory cells and the controller associated with the memory device. In some implementations, the memory device initiated low temperature thermal throttling may require more changes to the controller and the memory cells of the memory device, whereas the host device initiated low temperature thermal throttling may require more changes to the operating system.

In some implementations, the cross temperature range temperature differences described herein may result in a slow read performance by the memory device 120 and/or may result in an occurrence of uncorrectable error correction code (UECC). In some implementations, a post-reflow refresh rate may require a restricted temperature range (e.g., above 20° C.) to avoid these problems. In some implementations, the low temperature thermal throttling operation can be embedded into NVM firmware. This may enable the NVM firmware to perform intensive dummy data movement in combination with data programming and erasing on a victim NAND block (e.g., the particular portion of the memory device 120), which may cause the temperature of the NVM to increase. In some cases, the system 100 may leverage the self-heating capabilities of the integrated circuit to increase the temperature of the NVM.

As indicated above, FIG. 5 is provided as an example. Other examples may differ from what is described with regard to FIG. 5.

FIG. 6 is a flowchart of an example method 600 associated with memory device initiated low temperature thermal throttling. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, the FG operation component 230, the throttling operation component 235, and/or the BG operation component 240) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include receiving low temperature thermal throttling information that enables a thermal throttling operation by the memory device (block 610). As further shown in FIG. 6, the method 600 may include performing the thermal throttling operation by moving dummy data from a controller associated with the memory device to a particular location of the memory device associated with the thermal throttling operation (block 620). As further shown in FIG. 6, the method 600 may include receiving a write command associated with writing data to the memory device or a read command associated with reading data from the memory device while the memory device is performing the thermal throttling operation (block 630). As further shown in FIG. 6, the method 600 may include stopping the thermal throttling operation based on receiving the write command or the read command (block 640). As further shown in FIG. 6, the method 600 may include performing a write operation associated with the write command or a read operation associated with the read command (block 650). As further shown in FIG. 6, the method 600 may include continuing the thermal throttling operation based on completing the write operation associated with the write command or the read operation associated with the read command (block 660).

The method 600 may include additional aspects, such as any single aspect or any combination of aspects described below and/or described in connection with one or more other methods or operations described elsewhere herein.

In a first aspect, the method 600 includes stopping the thermal throttling operation based on the temperature of the memory device satisfying the temperature threshold or based on an expiration of a time for performing the thermal throttling operation.

In a second aspect, alone or in combination with the first aspect, continuing the thermal throttling operation comprises automatically resuming the thermal throttling operation until the temperature of the memory device satisfies the temperature threshold.

In a third aspect, alone or in combination with one or more of the first and second aspects, the method 600 includes initiating a background operation associated with the memory device based on completing the thermal throttling operation, wherein the background operation associated with the memory device is a temperature critical background operation that includes a data folding operation.

In a fourth aspect, alone or in combination with one or more of the first through third aspects, the method 600 includes transmitting a thermal throttling operation complete message based on completing the thermal throttling operation.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a memory device includes one or more components configured to: receive, from a host device, low temperature thermal throttling information that enables a thermal throttling operation by the memory device, wherein the low temperature thermal throttling information includes an indication of a temperature threshold; initiate the thermal throttling operation based on the low temperature thermal throttling information, wherein the one or more components, to initiate the thermal throttling operation, are configured to move dummy data from a controller associated with the memory device to a particular location of the memory device associated with the thermal throttling operation; and complete the thermal throttling operation based on the temperature of the memory device satisfying the temperature threshold.

In some implementations, a system includes a host device configured to: transmit low temperature thermal throttling information to a memory device that enables the memory device to perform a thermal throttling operation, wherein the low temperature thermal throttling information includes an indication of a temperature threshold; and the memory device, wherein the memory device is configured to: receive the low temperature thermal throttling information from the host device; initiate the thermal throttling operation based on the low temperature thermal throttling information, wherein the memory device, to initiate the thermal throttling operation, is configured to move dummy data from a controller associated with the memory device to a particular location of the memory device associated with the thermal throttling operation; and complete the thermal throttling operation based on the temperature of the memory device satisfying the temperature threshold.

In some implementations, a method performed by a memory device includes receiving low temperature thermal throttling information that enables a thermal throttling operation by the memory device based on a temperature of the memory device not satisfying a temperature threshold; performing the thermal throttling operation by moving dummy data from a controller associated with the memory device to a particular location of the memory device associated with the thermal throttling operation; receiving a write command associated with writing data to the memory device or a read command associated with reading data from the memory device while the memory device is performing the thermal throttling operation; stopping thermal throttling operation based on receiving the write command or the read command; performing a write operation associated with the write command or a read operation associated with the read command; and continuing the thermal throttling operation based on completing the write operation associated with the write command or the read operation associated with the read command.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
      receive, from a host device, low temperature thermal throttling information that enables a thermal throttling operation by the memory device,
         wherein the low temperature thermal throttling information includes an indication of a temperature threshold;
      initiate the thermal throttling operation based on the low temperature thermal throttling information,
         wherein the one or more components, to initiate the thermal throttling operation, are configured to move dummy data from a controller associated with the memory device to a particular location of the memory device associated with the thermal throttling operation;
      stop the thermal throttling operation to perform a write operation associated with a write command or a read operation associated with a read command; and
      complete the thermal throttling operation based on a temperature of the memory device satisfying the temperature threshold.

2. The memory device of claim 1, wherein one or more components are configured to receive, from the host device, a start command that instructs the memory device to start the thermal throttling operation, and wherein the one or more components, to initiate the thermal throttling operation, are configured to initiate the thermal throttling operation based on the start command.

3. The memory device of claim 1, wherein the one or more components, to initiate the thermal throttling operation based on the low temperature thermal throttling information, are configured to initiate the thermal throttling operation based on a current temperature of the memory device not satisfying the temperature threshold.

4. The memory device of claim 1, wherein the low temperature thermal throttling information enables the thermal throttling operation and includes an indication of a time for performing the thermal throttling operation.

5. The memory device of claim 4, wherein the one or more components are configured to stop performing the thermal throttling operation based on the temperature of the memory device satisfying the temperature threshold or based on an expiration of the time for performing the thermal throttling operation.

6. The memory device of claim 1, wherein the one or more components are configured to stop the thermal throttling operation to perform the write operation or the read operation by being configured to:
   receive the write command associated with writing data to the memory device or the read command associated with reading data from the memory device,
      wherein the write command or the read command is associated with a standard memory operation of the memory device and is received from the host device while the memory device is performing the thermal throttling operation;
   stop the thermal throttling operation;
   perform a write operation associated with the write command or a read operation associated with the read command; and
   continue the thermal throttling operation based on completing the write operation associated with the write command or the read operation associated with the read command.

7. The memory device of claim 1, wherein the one or more components are configured to initiate a background operation associated with the memory device based on completing the thermal throttling operation.

8. The memory device of claim 7, wherein the background operation associated with the memory device is a temperature critical background operation that includes a data folding operation.

9. The memory device of claim 1, wherein the particular location of the memory device includes one or more bits of the memory device that are allocated for receiving the dummy data from the controller associated with the memory device.

10. A system, comprising:
   a host device configured to:
      transmit low temperature thermal throttling information to a memory device that enables the memory device to perform a thermal throttling operation,
         wherein the low temperature thermal throttling information includes an indication of a temperature threshold; and the memory device, wherein the memory device is configured to:
receive the low temperature thermal throttling information from the host device;
initiate the thermal throttling operation based on the low temperature thermal throttling information,
wherein the memory device, to initiate the thermal throttling operation, is configured to move dummy data from a controller associated with the memory device to a particular location of the memory device associated with the thermal throttling operation;
stop the thermal throttling operation to perform a write operation associated with a write command or a read operation associated with a read command; and
complete the thermal throttling operation based on a temperature of the memory device satisfying the temperature threshold.

11. The system of claim 10, wherein the low temperature thermal throttling information enables the thermal throttling operation and includes an indication of a time for performing the thermal throttling operation.

12. The system of claim 11, wherein the memory device is configured to stop performing the thermal throttling operation based on the temperature of the memory device satisfying the temperature threshold or based on an expiration of the time for performing the thermal throttling operation.

13. The system of claim 10, wherein the memory device is configured to stop the thermal throttling operation to perform the write operation or the read operation by being configured to:
receive the write command associated with writing data to the memory device or the read command associated with reading data from the memory device,
wherein the write command or the read command is associated with a standard memory operation of the memory device and is received from the host device while the memory device is performing the thermal throttling operation;
stop the thermal throttling operation;
perform a write operation associated with the write command or a read operation associated with the read command; and
continue the thermal throttling operation based on completing the write operation associated with the write command or the read operation associated with the read command.

14. The system of claim 10, wherein the memory device is configured to initiate a background operation associated with the memory device based on completing the thermal throttling operation.

15. The system of claim 14, wherein the background operation associated with the memory device is a temperature critical background operation that includes a data folding operation.

16. The system of claim 10, wherein the memory device is configured to transmit a thermal throttling operation complete message to the host device based on completing the thermal throttling operation.

17. A method performed by a memory device, comprising:
receiving low temperature thermal throttling information that enables a thermal throttling operation by the memory device based on a temperature of the memory device not satisfying a temperature threshold;
performing the thermal throttling operation by moving dummy data from a controller associated with the memory device to a particular location of the memory device associated with the thermal throttling operation;
receiving a write command associated with writing data to the memory device or a read command associated with reading data from the memory device while the memory device is performing the thermal throttling operation;
stopping the thermal throttling operation based on receiving the write command or the read command;
performing a write operation associated with the write command or a read operation associated with the read command; and
continuing the thermal throttling operation based on completing the write operation associated with the write command or the read operation associated with the read command.

18. The method of claim 17, further comprising stopping the thermal throttling operation based on the temperature of the memory device satisfying the temperature threshold or based on an expiration of a time for performing the thermal throttling operation.

19. The method of claim 17, wherein continuing the thermal throttling operation comprises automatically resuming the thermal throttling operation until the temperature of the memory device satisfies the temperature threshold.

20. The method of claim 17, further comprising initiating a background operation associated with the memory device based on completing the thermal throttling operation, wherein the background operation associated with the memory device is a temperature critical background operation that includes a data folding operation.

* * * * *